Feb. 1, 1955   D. E. MORGAN   2,700,956
CHICKEN BROODER
Filed June 22, 1953   2 Sheets-Sheet 1
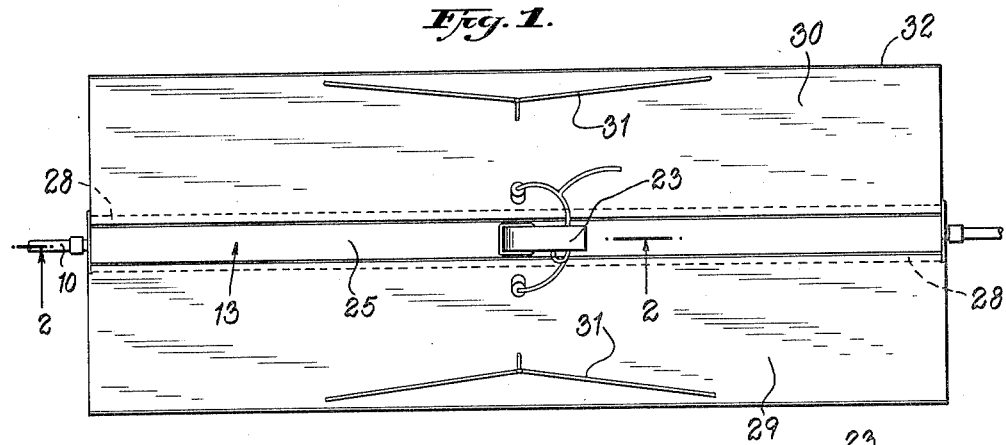
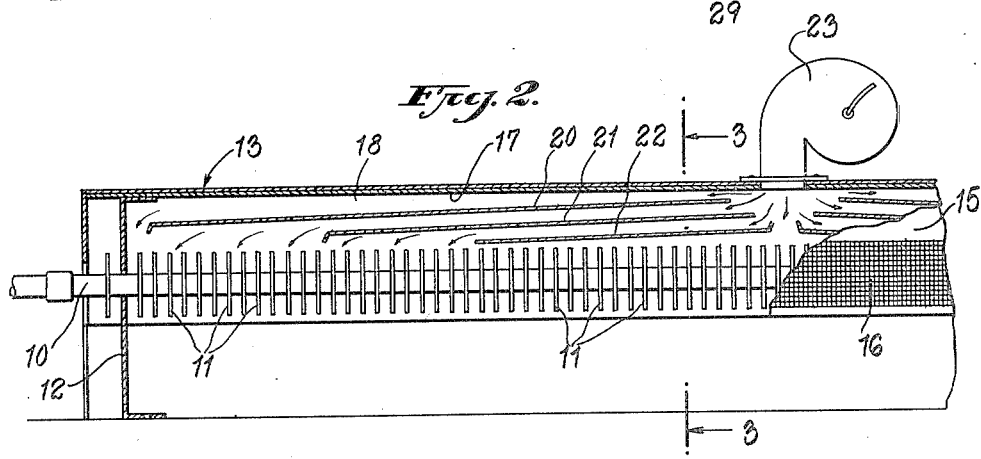
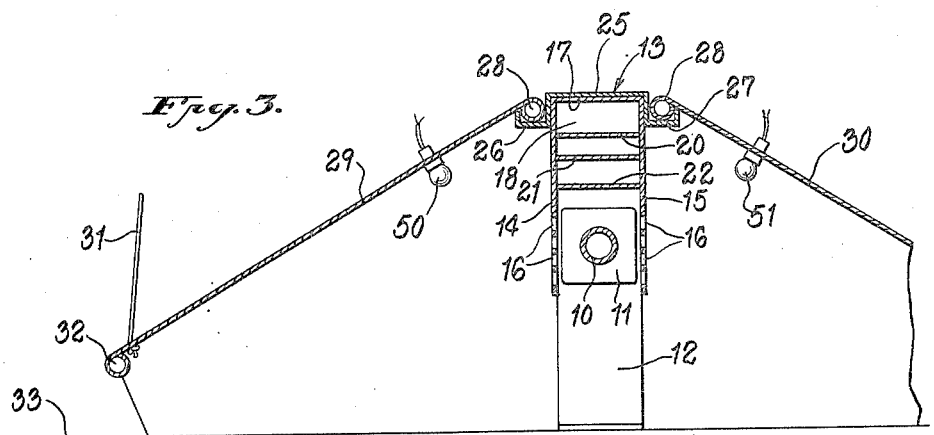
INVENTOR.
DAVID E. MORGAN
BY
Ward Crosley & Neal
ATTORNEYS

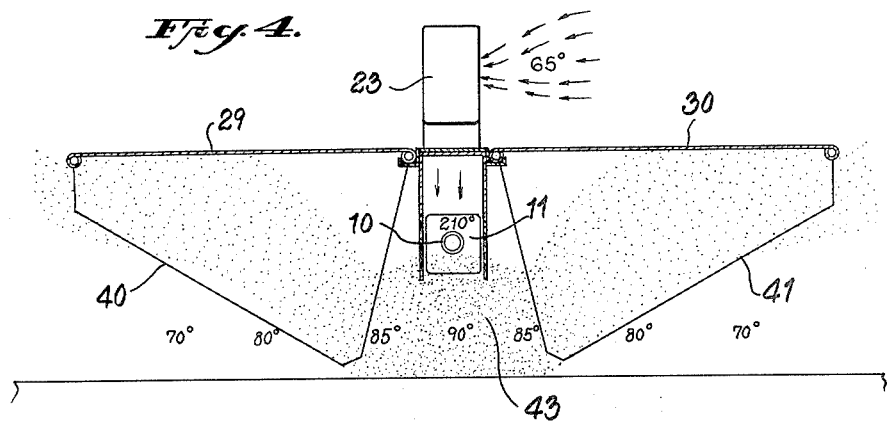
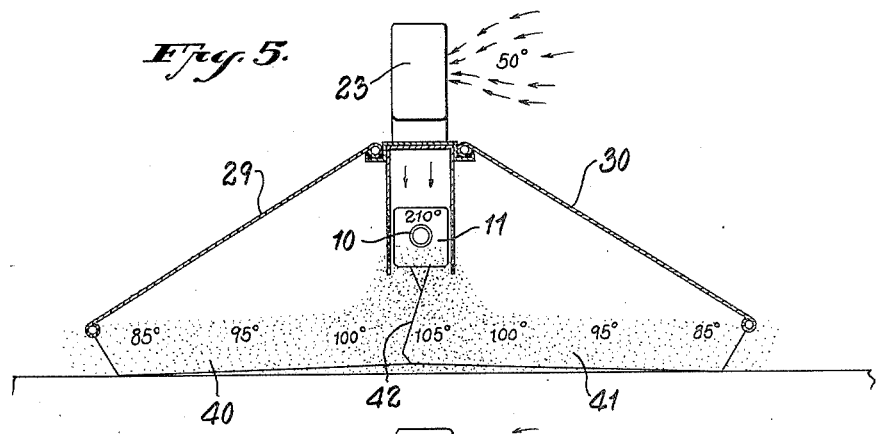
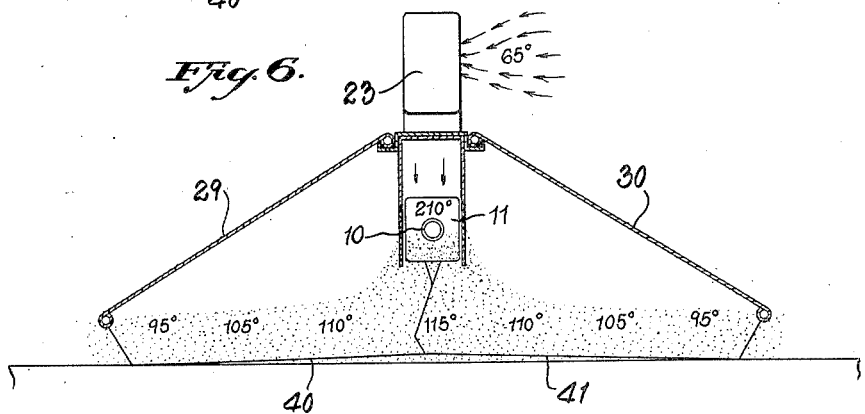

United States Patent Office 2,700,956
Patented Feb. 1, 1955

2,700,956

CHICKEN BROODER

David E. Morgan, Pennsauken, N. J., assignor to Warren Webster & Company, Camden, N. J., a corporation of New Jersey Application June 22, 1953, Serial No. 363,007

4 Claims. (Cl. 119—31)

This invention relates to chicken brooder constructions and the like.

In accordance with this invention, a brooder construction is provided in a form such as to be adapted to be heated preferably by a single tube for conducting heating fluid therethrough, such tube having numerous radiating fins and being adapted to be positioned to extend horizontally above the floor or liter level directly through a series of the brooders as located in a brooder house. Each brooder preferably comprises a central support or ridge portion containing an elongated chamber extending along above the finned tubing and having hinged along each side thereof cover or roof portions which normally extend downwardly and outwardly at either side, such cover portions being supported or suspended in a manner such that the outer lower edges thereof are spaced above the floor level at a sufficient height to enable the chickens to run in and out of either side of the brooder. The cover portions are also adapted to be so suspended that their outer edges may be elevated to various higher levels to allow more heated air to escape from the brooder after the chickens have grown older and do not require such high brooder temperatures. Each brooder is preferably provided with blower means for blowing fresh cold air from above down past the finned tubing into the brooder, and the relationship of the finned tubing with respect to the hinged covers is such that the maximum temperature in the brooder is along the region just under the finned tubing while the temperatures are progressively lower toward each of the side openings of the brooder, the variation of the temperatures from along the middle to the sides depending upon the height to which the hinged covers are raised and upon the temperature of the air in the brooder house which is blown down into the brooder.

The arrangement of the brooder parts is thus such that the chickens are always free to run in and out of the brooder through the open spaces at both sides thereof, and they are free to gather within the brooder along either side of the center line at varying distances therefrom depending upon the particular temperature which they desire or find most comfortable, and the range of temperatures occurring in the brooder may be easily adjusted to lower levels as desirable as the chickens grow older, simply by suspending the outer edges of the covers at higher levels.

The invention further provides an inexpensive arrangement easy to construct and assemble, as well as being convenient to adjust to accommodate the growth of the chickens, and the covers may readily be elevated or removed to fully expose the floor or litter area for easy cleaning and sweeping.

Various further and more specific objects, features and advantages of the invention will appear from the detailed description given below taken in connection with the accompanying drawings which form a part of this specification and illustrate by way of example, a preferred form of the invention. The invention consists in such novel features, arrangements and combinations of parts as may be shown and described herein.

In the drawings:

Fig. 1 is a plan view of a preferred embodiment of the invention;

Fig. 2 is an enlarged sectional view, partly broken away, taken substantially along line 2—2 of Fig. 1;

Fig. 3 is a transverse sectional view taken substantially along line 3—3 of Fig. 2; and Figs. 4, 5 and 6 are transverse sectional views showing the roof or cover portions in two different positions and indicating the temperatures occurring at various regions in the brooder under certain conditions.

Referring now to the drawings in further detail, a pipe or tube for conducting heating fluid such as hot water through the brooder, is indicated at 10, provided with a series of closely spaced radiating fins as at 11, such as commonly provided on hot water or steam heating conduits as used for household heating purposes, for example. Such tubing may preferably extend straight through one brooder after another in case a number of the brooders are to be located in a single brooder house, but only the parts of the tubing which are within each brooder are provided with radiating fins.

As best shown in Figs. 2 and 3, the finned tubing may be carried on supports as at 12, located at each end of each brooder, which supports also carry a longitudinal central or ridge-like hollow structure as at 13 mounted to extend along above the finned tubing. This central structure may be formed of sheet metal and includes two side wall portions as at 14, 15 extending respectively down past the sides of the finned tubing and formed with perforations as at 16, at the regions adjacent the side edges of the fins, in order to permit heated air to readily flow out into the brooder. The side portions 14 and 15 may be joined at the top by a portion 17 which closes the top of the central or ridge-like structure to provide a space as at 18 therein, which preferably contains a plurality of baffles suitably shaped and positioned as at 20, 21 and 22 for distributing air from a blower 23, substantially uniformly along within the space 18 and down between the fins of the finned tubing. The blower 23 may be of any suitable known form driven by an electric motor for example, and arranged to draw air from the space above, in the brooder house, and blow same down between the radial fins.

The top of the chamber 18 may be surmounted by an inverted channel-shaped sheet metal member as at 25, formed with channel-like extensions as at 26, 27 at either side adapted to receive rounded over upper inner edge portions 28 formed on the brooder cover or roof portions 29, 30. That is, the channel-shaped extensions 26, 27 cooperate with the rounded cover edge portions 28 to form hinge means about which the cover or roof portions may be raised or lowered as by the use of suspending wires or cords 31, the latter being suitably attached through pulleys or other means (not shown) to the ceiling or roof structure of the brooder house.

As will be apparent from Figs. 3, 5 and 6, the cover or roof portions 29, 30 may normally be positioned to extend outwardly and downwardly from the center portion of the brooder to terminate at rounded lower edge portions such as at 32, spaced above the floor or litter level 33 by a distance sufficient to permit the chickens to run in and out of the brooder, while still retaining enough hot air within the brooder for a sufficient length of time to maintain the desired or necessary temperatures for the young chicks. For example, if the heating fluid in the tube 10 is at 210° F. as indicated in Fig. 5, and if the surrounding temperatures in the brooder house is, for example, about 50° F., then the structure is such that along the litter level in the brooder the temperature will vary from about 105° F. just beneath the finned tubing, down to about 85° F. at the regions along the side entrances, the temperatures in various positions varying substantially as indicated in Fig. 5. Fig. 6 indicates the temperature conditions which will occur under similar circumstances, except that here the air which enters the blower from the brooder house is at 65° F. instead of 50° F.

Fig. 4 shows the temperature conditions which will occur when the cover or roof portions are raised to horizontal positions and assuming that the finned tubing temperature is 210° F. and with the surrounding air at 65° F. It is desirable to suspend the covers in this position when the chicks have become approximately five weeks or more of age, or earlier in case the brooder house temperatures are higher than above indicated.

It should be mentioned that the heated air beneath the brooder cover or roof portions is normally prevented from escaping out of the ends of the brooder when the covers are in the positions shown in Figs. 5 and 6, by end wall portions as at 40, 41, which are affixed to and depend vertically from each end edge of each cover portion. That is, when the cover portions are down as in Figs. 5 and 6, the end wall portions 40, 41 will come together and overlap somewhat as indicated at 42. However, when the cover portions are raised as shown in Fig. 4, their inner edges will be spaced apart, leaving spaces as at 43 at each end of the brooder through which hot air may more readily escape.

It will be understood that the cover or roof portions may be suspended if desired, at various positions intermediate those shown in Figs. 4 and 5 for example, but however the covers are adjusted, there will be a gradual variation in the temperature in various regions along the floor or litter level of the brooder, with the higher temperature along the middle, so that the chicks are permitted to satisfy their individual temperature requirements. As the chicks increase in size, the brooder wings or covers are in fact preferably progressively raised to discharge more heat from the brooder into the brooder house, particularly to the regions close to the brooder. This is a desirable feature, in that, as the chicks grow larger they will have available a larger warm area, still with varying temperatures suiting their individual requirements, and at the same time lessening the concentration of the chicks in any particular region as they increase in size.

As indicated in Fig. 3, electric light bulbs as at 50, 51 may be mounted to direct light onto the heated region within each side of the brooder for attracting the baby chicks to such region. The brooder may of course be used for young birds or animals other than chickens.

The construction as manufactured for shipment may comprise a length of the finned tubing mounted in the central or ridge structural portion 13 separate from the covers 29 and 30. And in installing the apparatus it is merely necessary to place the central finned tubing and ridge assembly at the desired location and connect thereto the heating fluid conduit. And the cover or roof portions 29 and 30 may then be simply hooked onto the channel-shaped extensions 26, 27 and connected to the suspending wires or cords 31.

When it is desired to expose the entire litter or floor area for cleaning or sweeping, the cover or roof portions 29, 30 may be simply lifted off, or if preferred, raised to positions as high or higher than shown in Fig. 4.

Although a preferred embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A brooder construction comprising in combination a length of finned tubing positioned to extend generally horizontally along above the litter level and centrally through the brooder for conducting a fluid heating medium therethrough, an elongated chamber structure mounted to extend along above said finned tubing, means supported on said chamber structure for blowing air into same and distributing such air along the finned tubing and down between the fins into the brooder, two cover members hinged respectively along opposite sides of said structure and being adapted to normally extend outwardly and downwardly with their outer edges spaced from the litter lever to provide entrances for chickens along each side of the brooder, and means connected to and for supporting said cover members with their outer portions at variable levels above the litter level.

2. A brooder construction comprising in combination a length of finned tubing positioned to extend along above the litter level through the brooder for conducting a fluid heating medium therethrough an elongated chamber structure mounted to extend along above said finned tubing, means mounted on said chamber for blowing air into same and distributing such air along and down past the tubing into the brooder, two cover members hinged respectively along opposite sides of said structure and being adapted to normally extend outwardly and downwardly with their outer edges spaced from the litter level to provide entrances for chickens along each side of the brooder, and means connected to and for suspending over said cover members respectively at various angular positions with respect to the hinge axes thereof.

3. A brooder construction comprising in combination a length of finned tubing positioned to extend along above the litter level through the brooder for conducting a fluid heating medium therethrough, an elongated chamber structure mounted to extend along above said finned tubing, means supported on said chamber structure for blowing air into same and distributing such air along the finned tubing and down between the fins into the brooder, two cover members hinged respectively along opposite sides of said structure and being adapted normally to extend outwardly and downwardly with their edges spaced from the litter level to provide entrances for chickens along each side of the brooder, means connected to and for adjustably supporting said cover members at various different angular positions with respect to their hinged axes, and each of said cover members having secured thereto at each end depending end wall portions normally forming end closures for the brooder when the covers are in their lower positions but said end wall portions being so shaped that when the cover portions are elevated at varying angles, outlets of varying size will be formed between the two end wall portions at each end of the brooder.

4. A brooder construction comprising in combination a narrow elongated chamber structure mounted in position to extend along above the litter level, the underside of such chamber structure being open to the space within the brooder; a length of finned tubing extending horizontally along at the lower portion of said chamber structure; a blower mounted on said chamber structure and arranged to blow air into same; a plurality of baffles extending along within the upper portions of said chamber structure and positioned to direct streams of air from said blower along the finned tubing and down along the fins into the region along a center line of the brooder; and two cover members hinged respectively along opposite sides of said chamber structure and adapted normally to extend outwardly and downwardly with their outer edges spaced from the litter level to provide entrances along each side of the brooder through which air is blown outwardly by said blower.

References Cited in the file of this patent

UNITED STATES PATENTS

| | | |
|---|---|---|
| 1,592,377 | Martin | July 13, 1926 |
| 1,650,042 | Rayon | Nov. 22, 1927 |
| 1,679,271 | Sanctuary et al. | July 31, 1928 |
| 1,808,364 | Martin | June 2, 1931 |
| 2,160,185 | Willauer | May 30, 1939 |